April 13, 1965   D. R. JASTER ETAL   3,178,640
ARRANGEMENT FOR TESTING BREAKDOWN OF THE INSULATION
OF A CONDUCTOR UTILIZING A DIRECT CURRENT CIRCUIT
TO MINIMIZE STRAY CAPACITANCE EFFECTS
Filed March 23, 1962
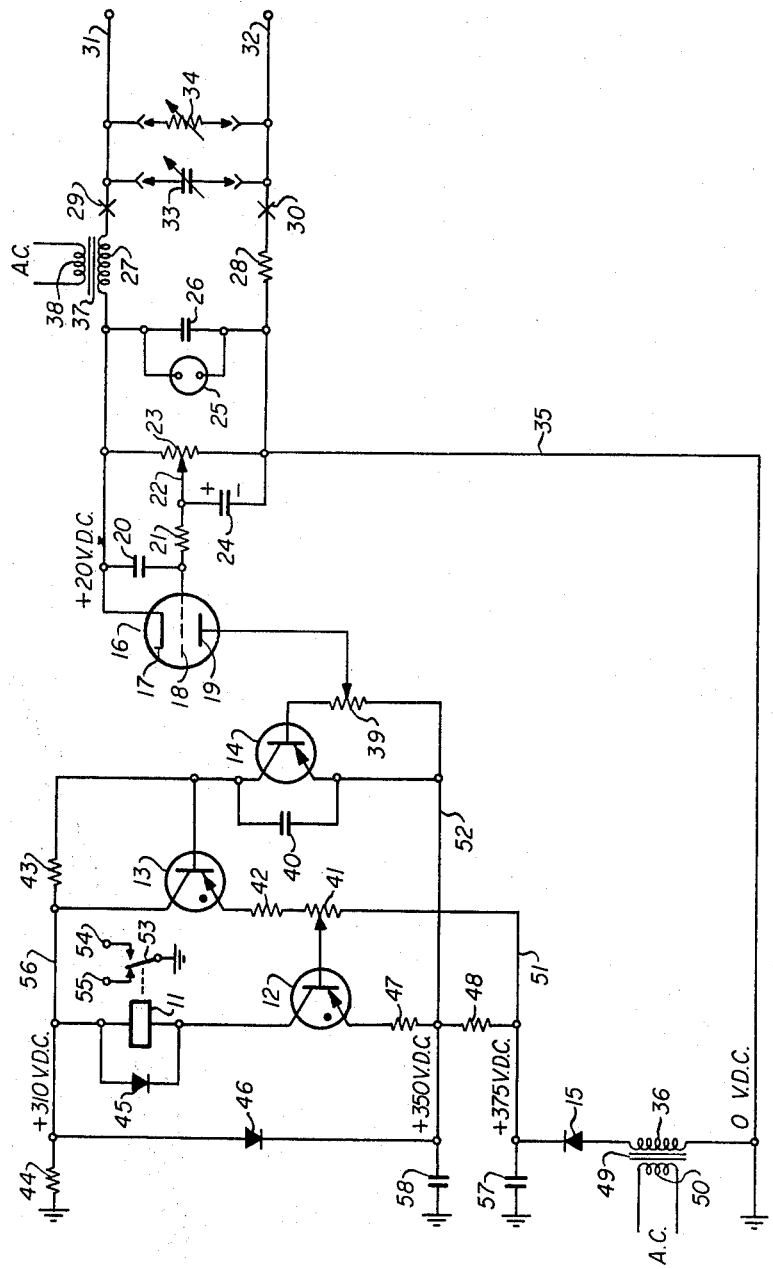
INVENTORS.
Dale R. Jaster
Stanley C. Ervin
BY
Atty.

3,178,640
ARRANGEMENT FOR TESTING BREAKDOWN OF THE INSULATION OF A CONDUCTOR UTILIZING A DIRECT CURRENT CIRCUIT TO MINIMIZE STRAY CAPACITANCE EFFECTS
Dale R. Jaster, Northlake, and Stanley C. Ervin, Addison, Ill., assignors to Automatic Electric Laboratories, Inc., Northlake, Ill., a corporation of Delaware
Filed Mar. 23, 1962, Ser. No. 181,875
6 Claims. (Cl. 324—54)

This invention relates to an improved arrangement for detecting an insulation breakdown in a conductor under test.

Insulation breakdown can be tested by the application of either a high voltage direct current or a high voltage alternating current. The advantage of using alternating current is that the insulation material under test is subjected to greater electrical stresses in this manner. However, it has been found that the stray capacitance existing between the conductor under test and the return path, such as ground, may be high enough to permit the ensuing alternating current flowing thru it to result in a faulty detection of an insulation breakdown.

It is a primary object of the present invention to provide an improved arrangement for detecting a breakdown in the insulation of a conductor under test, which is subjected to the aforementioned alternating current stresses, and yet render the effect that the above mentioned stray capacitance has on the detector substantially negligible.

According to the principal feature underlying the invention, this is accomplished by superimposing on the path of the aforementioned alternating current a direct current circuit and letting the detector respond to the direct current flow over the conductor under test.

The embodiment of the invention will now be described with reference to the accompanying drawing:

In this drawing, 31 is the conductor under test, 32 represents the return path, such as a cable sheath, or possibly the ironwork of equipment, for example a shelf of automatic telephone switches, of which conductor 31 is a part. 29 and 30 represent the test clips or similar terminations of the breakdown test detector. The circuit of this detector proper is illustrated to the left of these clips as viewed in the drawing. Leakage resistance between conductor 31 and return path 32 is represented by variable resistor 34, while variable capacitor 33 indicates the stray capacitance which exists between 31 and 32.

In the breakdown test arrangement, as shown in the drawing, two power sources are used, namely an alternating power source and a direct current source. The alternating current source for providing the breakdown voltage is developed across the secondary winding 27 of transformer 37, the primary 38 of which may be connected to the 115 volt commercial power network. Transformer 37 is a step-up transformer and may provide an alternating current potential in the order of 500 to 1500 volts across the terminals of secondary winding 27. Means, not shown in the drawing, may be provided in the primary circuit of transformer 37 to adjust this alternating current potential across the secondary winding to the desired value.

The direct current source is represented by another step-up transformer 49 and rectifier 15. The primary winding 50 of transformer 49 again may be connected to the 115 volt commercial current network. This direct current power supply may be designed so that a direct current voltage of, say +375 volts is developed on conductor 51 with respect to ground.

The breakdown detector further includes a vacuum tube 16, a three stage transistor-amplifier comprising transistors 14, 13 and 12, and a relay 11 in the output circuit of last stage transistor 12. Under normal conditions, and with the power turned on, first stage transistor 14 is "off," second stage transistor 13 is "on," and third stage transistor 12 is also "on" so that relay 11 is normally operated. The diode 45 across the winding of relay 11 serves to render this relay slow to release. It will be noted from the drawing, that upon release of relay 11 its armature spring 53 closes ground to terminal 54 to which a visual and/or audible indicating device, not shown in the drawing, is connected. Terminal 55 may be used for an auxiliary indicating connection if desired.

The transistor-amplifier is powered by the voltages existing between conductors 51 or 52 and 56, the latter conductor being connected to ground through resistor 44 as shown. Zener diode 46 serves to maintain the operating voltage of the transistor-amplifier at a substantially constant value.

Conductor 52 is connected to conductor 51 through the medium of a resistor 48 and electrolytic condensers 57 and 58. In the embodiment shown, the components are chosen so that with a voltage of approximately +375 volts on conductor 51, the voltage on conductor 52 is roughly +350 volts, and that on conductor 56 roughly +310 volts. The voltage developed on potentiometers 39 and 41 serves to adjust the gain of the first stage and third stage transistor respectively; the gain of the second stage transistor 13 depends on the value of resistor 43. Resistor 42 is an emitter-resistor and supplements that of voltage divider 41. Resistor 47 serves as the emitter-resistor of third stage transistor 12.

Reverting now to the portion of the circuit shown in the upper right hand corner of the drawing, capacitor 26 is connected between the left hand terminal, as viewed in the drawing, of transformer winding 27 and ground lead 35. 28 is a current limiting resistor and 25 is a neon lamp or other protective device which serves to protect capacitor 26 against excessive alternating current voltages. It will now be appreciated that with transformer 37 energized from the alternating current power source, the following principal alternating current circuit extends over the system under test: right hand terminal of secondary winding 27, test clip 29, conductor under test, 31, leakage resistor 34 in parallel with stray capacitance 33, return path 32, test clip 30, limiting resistor 28, capacitor 26, left hand terminal of secondary winding 27.

Turning now to the direct current circuit, which according to the invention is superimposed on the alternating current circuit, it will be noted that the following direct current path may be traced through tube 16: +350 volts on conductor 52, the emitter-base path of transistor 14 shunted by potentiometer 39, the slider of this potentiometer, plate 19 and cathode 17 of tube 16, voltage divider 23, and ground on lead 35. The slider 22 of potentiometer 23 is connected by way of high value resistor 21 to grid 18 of tube 16 so that the grid has a negative bias with respect to cathode 17. The voltage divider 23 is adjusted so that the grid bias derived from slider 22 maintains tube 16 at near cut-off during normal conditions, that is, while test clips 29 and 30 are either disconnected, or connected to a system with very high leakage resistance 34. For example, the cathode voltage of tube 16 under these conditions may be in the order of +20 volts and the grid voltage several volts lower.

It will be understood that voltage divider 23 is connected in parallel with capacitor 26 and thus also in parallel with the circuit extending from the system under test, by means of secondary winding 27 and test clip 29 on the one hand and limiting resistor 28 and test clip 30 on the other hand. Capacitor 26 may have a capacity of approximately 1 microfarad, whereas the stray capacitance 33 is typically in the order of 0–.22 microfarad. It will be appreciated that with test clips 29 and 30 connected up, once capacitors 26 and 33 have been initially charged to the aforementioned voltage of approximately +20 volts on cathode 17, the current I1 flowing through tube 16 under normal conditions, that is with leakage resistance 34 at a high value, is primarily determined by the resistance of potentiometer 23 as above discussed. Furthermore once the charging current for capacitor 26 and 33 has been absorbed the value of stray capacitance 33 has no effect on the current flowing through tube 16.

If the alternating current power source is now assumed to be connected to transformer 37, the above mentioned alternating current will be caused to flow over the system under test so that the system is subjected to the desired breakdown stresses. Precautions have been taken so that the flow of this alternating current does not reflect back into the detector circuit. For one thing, due to the relatively large size of capacitor 26 the alternating current voltage drop across this capacitor is relatively small. Also, capacitor 20, which may be in the order of .02 microfarad and which is connected in parallel to the upper section of potentiometer 23 in series with high ohm resistor 21 shunts the grid-cathode path of tube 16 for alternating current and thus helps to render the bias of the tube independent of alternating current voltages appearing across capacitor 26. Moreover tube 16, which normally is biased to near cut-off as above described, presents a very high plate-cathode resistance so that whatever alternating current voltages reach the tube 16 will have slight effect on the plate current flow through the tube. A further safeguard in the detector circuitry is the shunt capacitor 40 shown connected across the emitter-collector path of the first stage transistor 14, and the slow release characteristics of relay 11 which is due to diode 45.

As illustrated in the drawing, the lower section of potentiometer 23 is paralleled by regulating electrolytic condenser 24, of say 8 microfarads. The purpose of this condenser is to maintain grid 18 of tube 16 at substantially the fixed bias potential regardless of fluctuations in the direct current flow of the system due to corresponding changes in the leakage resistance 34, and hence the corresponding variations in the D.C. voltage across capacitor 26, during tests on successive conductors. This will be explained in further detail hereafter. With capacitor 20 connected in shunt between cathode 17 and grid 18 of the tube the potential of both of these electrodes will remain substantially the same in spite of the aforementioned alternating current voltages across capacitor 26 so that the plate resistance of the tube remains relatively unchanged and hence the detector is unaffected by these changes in alternating current voltages.

Let it now be assumed that test clips 29, 30 are connected to a system with a low leakage resistance 34 which may have developed due to breakdown under the stresses imposed on the system 31, 32 by the high voltage alternating current voltage applied thereon from winding 27. Under such a condition a comparatively low resistance shunt will exist across potentiometer 23 with the result that the direct current flowing out of cathode 17 is substantially increased to a new value I2. The ensuing drop in potential of cathode 17 with respect to ground brings about a proportional drop in voltage on the potentiometer pointer 22 and the bias of tube grid 18. This in turn means that the potential existing between grid 18 and cathode 17 will be reduced. This reduction in the negative bias on grid 18 further aids in reducing the effective plate cathode resistance of tube 16 under this condition. It may be mentioned in passing that the capacity on the stabilizing capacitor 20 is small enough to permit this regenerative action to become effective. As a result of the increased current flow through tube 16, the base of transistor 14 becomes more negative with respect to its emitter so that transistor 14 is turned on and consequently transistors 13 and 12 are successively turned off. The turning-off of transistor 12 permits relay 11 to release. A breakdown indication is given by means of contact 53 and the fault indicating device, not shown, connected to terminals 54 and/or 55.

Thus, the detector according to the present invention substantially responds to the change in plate current from the value I1 to the value I2, but both of these currents as will be readily understood from the above description, are independent of stray capacitance 33.

It will be understood from what has been said above that capacitor 26 has the multiple function (1) of serving as an impedance element across which the direct current is both impressed and detected so that only two terminations 29 and 30 are required; (2) of providing a bypass for the flow of alternating current; and (3) of providing a source of stored energy to furnish the necessary charging current for stray capacitances such as 33. Resistor 28 also has multiple functions. It tends to minimize shock effects to the operator upon inadvertently touching test clips 29, 30; it limits the flow of breakdown alternating current to a safe value; and it also limits the direct current flowing through the system under test. In case of short circuits between conductors 31 and 32, it will thus serve as a protection of the detecting and amplifying equipment.

The following is a list of the components used in the embodiment described herein:

| Component | Value |
| --- | --- |
| Tube 16 | Type 6J6. |
| Transistors 14, 13 and 12 | Type 2N527. |
| Capacitor 26 | 1 mf. |
| Stabilizing capacitor 20 | .02 mf. |
| Regulating capacitor 24 | 8 mf. (electrolytic). |
| Shunt capacitor 40 | 1 mf. |
| Power capacitor 57 | 16 mf. (electrolytic). |
| Power capacitor 58 | 20 mf. (electrolytic). |
| Limiting resistor 28 | 50 kilo-ohms. |
| Voltage divider 23 | 2.2 megohm. |
| Grid resistor 21 | 1 megohm. |
| Potentiometer 39 | 50 kilo-ohms. |
| Potentiometer 41 | 10 kilo-ohms. |
| Emitter resistor 42 | 2.2 kilo-ohms. |
| Emitter resistor 47 | 620 ohms. |
| Power resistor 44 | 20 kilo-ohms. |
| Power resistor 48 | 2 kilo-ohms. |
| Resistor 43 | 50 kilo-ohms. |
| Relay 11 | 4000 ohms. |
| Shunt diode 45 | Type 1N2071. |
| Zener diode 46 | Type 1N1780. |
| Power rectifier 15 | Type U213. |
| Neon lamp 25 | Type NE2. |

With the above components the testing arrangement described herein is able to detect leakage resistances from approximately 6 megohms down to about 220 kilo-ohms depending on adjustment. If adjusted to operate at the lower end of this range the detector is sensitive enough to respond to a leakage resistance of as low as 220 kilo-ohms but not to respond to a leakage resistance which is 10% higher than this figure. Furthermore the circuit operates satisfactorily within a range of stray capacitances from 0–.22 microfarad.

Having fully described the features and aspects of our invention, what we consider to be new will be pointed out in the appended claims.

What is claimed is:

1. An arrangement for testing breakdown of the insulation between a conductor under test and an adjacent second conductor, said two conductors having a certain amount of stray capacitance therebetween, an alternating current source connectible across said conductors for impressing thereacross an alternating current voltage of a magnitude to place said insulation under breakdown stress whereby a predetermined amount of alternating current is permitted to flow over said two conductors and said stray capacitance in series; apparatus for rendering said breakdown test substantially independent of said stray capacitance, said apparatus including means for additionally connecting a direct current source across said conductors so that a direct current is caused to flow in a circuit extending over said two conductors and the leakage resistance therebetween in series, and an amplifying device having first and second output electrodes and a control electrode, said output electrodes being serially included in said direct current circuit, and means being provided for applying a bias potential to said control electrode such that for relatively high resistance of said leakage path the amplifying device is maintained near cutoff but that for relatively low resistance values of said leakage path said amplifying device is permitted to operate in response to said flow of direct current to indicate the existence of the high leakage condition between said conductors.

2. A test arrangement as claimed in claim 1 wherein one terminal of said A.C. source is connected to said first-mentioned conductor, and wherein a capacitor is connected between said other conductor and the other terminal of said source.

3. A test arrangement as claimed in claim 1 wherein the last-mentioned means comprises a voltage divider connected across said capacitor, said bias potential being derived across one section of said voltage divider.

4. A test arrangement as claimed in claim 3 wherein a regulating capacitor is connected across the other section of said voltage divider for maintaining a given bias potential on said control electrode despite fluctuations in the direct current voltage in the first-mentioned capacitor which are due to variations in the resistance of said leakage path.

5. A test arrangement as claimed in claim 1 and comprising a stabilizing capacitor connected between said control electrode and said first output electrode.

6. A test arrangement as claimed in claim 1 wherein said direct current circuit further comprises an amplifier connected in the output circuit of said amplifying device, and a breakdown indicating device connected in the output circuit of said amplifier.

References Cited by the Examiner
UNITED STATES PATENTS

| | | | |
|---|---|---|---|
| 1,823,492 | 9/31 | Houck | 324—54 |
| 2,087,783 | 7/37 | Savage | 324—54 |

WALTER L. CARLSON, *Primary Examiner.*

JAMES W. LAWRENCE, *Examiner.*